April 9, 1946.　　　　W. MELIN　　　　2,398,239
MACHINE BASE FOR MILLING MACHINES
Filed Feb. 10, 1943　　　2 Sheets-Sheet 1
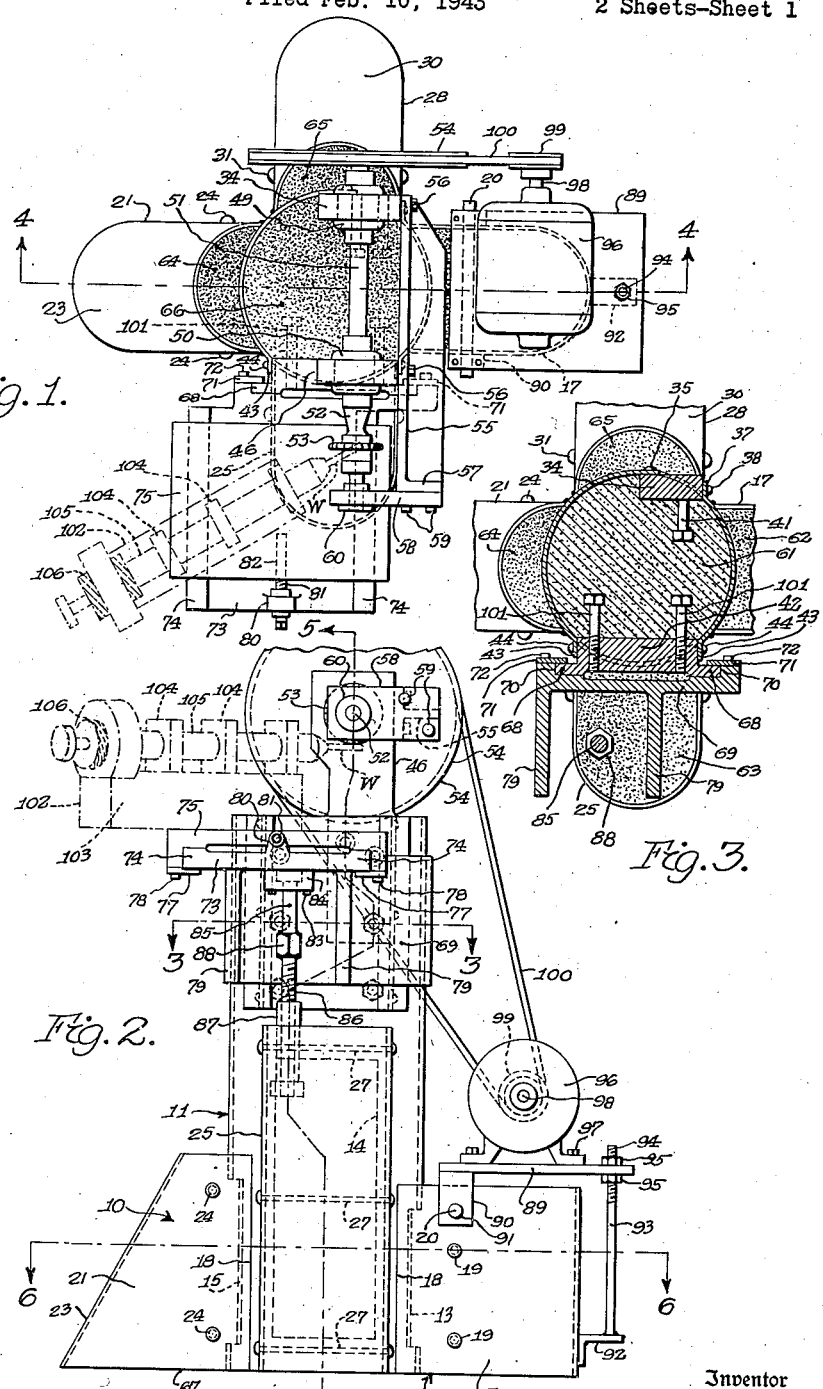
Inventor
William Melin
By Barthel + Bugbee
Attorneys April 9, 1946.  W. MELIN  2,398,239
MACHINE BASE FOR MILLING MACHINES
Filed Feb. 10, 1943  2 Sheets-Sheet 2
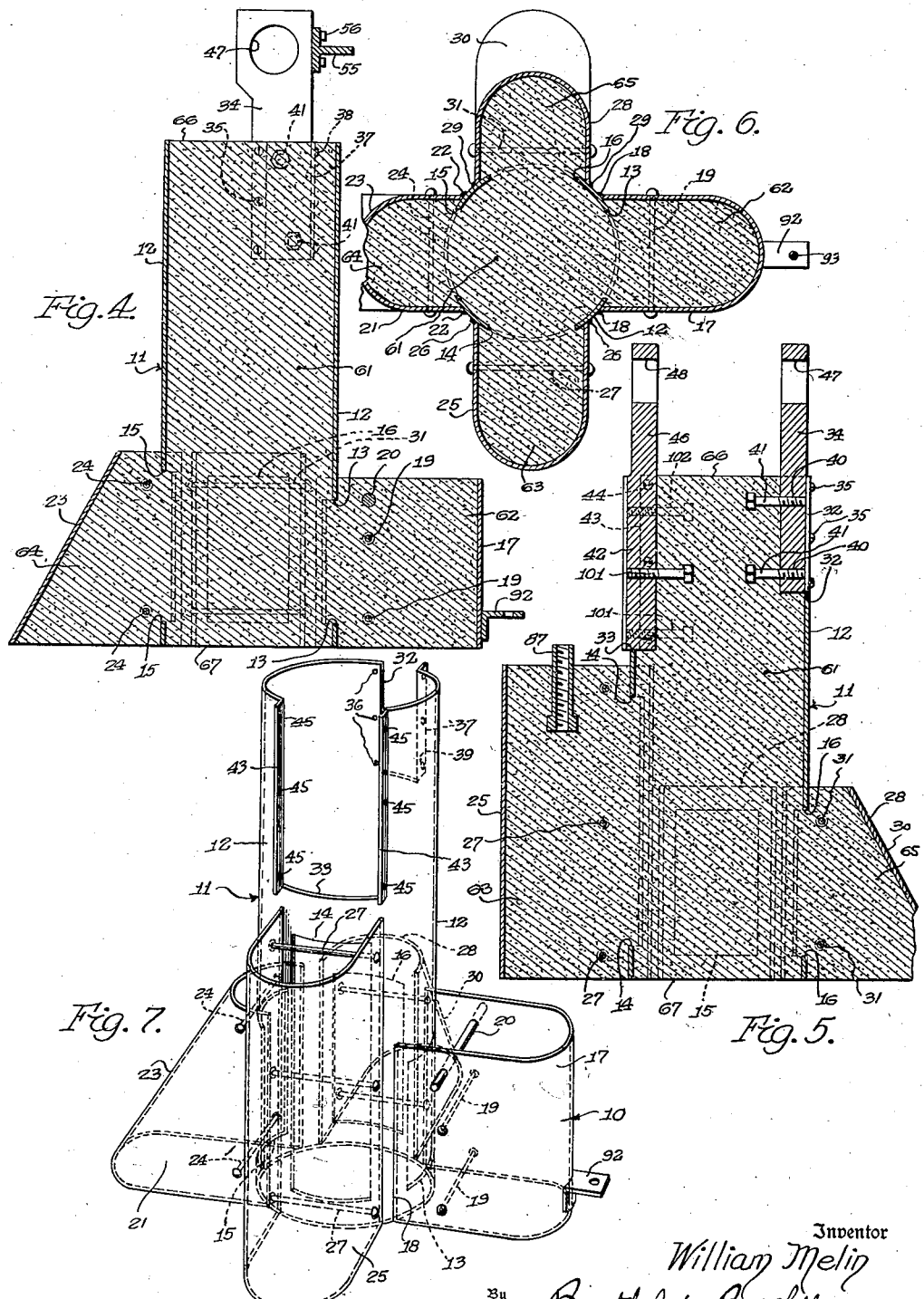
Inventor
William Melin
By Barthel & Bugbee
Attorneys Patented Apr. 9, 1946

2,398,239

UNITED STATES PATENT OFFICE 2,398,239

MACHINE BASE FOR MILLING MACHINES

William Melin, Detroit, Mich.

Application February 10, 1943, Serial No. 475,392

6 Claims. (Cl. 90—11)

The present invention relates to machine bases and more particularly to a base for supporting milling, grinding and cutting machine bases.

The primary object of the invention is to provide a machine base which is economical in construction, readily and easily formed from inexpensive materials.

Another object of the invention is to provide a machine base for milling, grinding, and cutting tools which is sturdy in construction and contains adequate weight to dampen the vibrations of the machine tool when the machine is in operation.

Another object of the invention is to provide a machine tool base including a skeletal shell portion filled with a heavy body material, such as cement or the like, so that various parts incident to the tool machine may be embedded therein as desired.

Another object of the invention is to provide a machine base as set forth in the preceding objects having a cruciform portion to brace the base and provide a relatively heavy foot portion so as to produce a low center of gravity and prevent tilting or rocking movement of the machine base.

Other objects and advantages of the invention will become apparent during the course of the following description of the accompanying drawings, wherein Figure 1 is a top plan view of the machine base embodying the invention showing the same supporting a milling cutter.

Figure 2 is a front elevational view of the machine base illustrating the manner in which the motor for driving the milling cutter is secured in place.

Figure 3 is a horizontal cross sectional view taken on line 3—3 of Figure 2, looking in the direction of the arrows and illustrating in detail the manner in which the slideways for the work support are formed as part of the base.

Figure 4 is a vertical cross-sectional view taken on line 4—4 of Figure 1, looking in the direction of the arrows, illustrating structural details of the machine base.

Figure 5 is a vertical cross-sectional view taken along the zig zag line 5—5 of Fig. 2, looking in the direction of the arrows, further illustrating in detail structural parts of the base and showing the milling machine arbor supporting bearing members.

Figure 6 is a horizontal cross-sectional view taken on line 6—6 of Fig. 2, looking in the direction of the arrows and illustrating the cruciform shape of the machine base, and Figure 7 is a perspective view of the skeletal shell structure illustrating in detail the various portions thereof.

In the drawings, wherein for the purpose of illustrating the invention and wherein like reference characters will be employed to designate like parts throughout the same, the reference character 10 will generally be employed to designate a foot portion of a machine base supporting a standard portion generally indicated as at 11. The standard portion is formed of a tubular sheet steel member 12 of the required height and said tubular sheet steel portion 12 has its lower end provided with relatively wide slots or openings 13, 14, 15 and 16.

Secured as by welding in alinement with the opening 13 is a U-shaped foot member 17 having its edges welded to the tubular skeleton column 12, as at 18, and extending across the leg portion of the U-shaped foot member 17 is a pair of reenforcing bars 19 to strengthen and add rigidity to the structure. The uppermost portion of the U-shaped leg member 17 is provided with a transverse bar 20 for accommodating a motor supporting bracket which will be hereinafter more fully described.

Similarly, a U-shaped foot portion 21 formed of sheet metal or the like is secured to the tubular metal column 12 in opposed relation to the foot portion 17 and is likewise welded or otherwise fastened in place at its ends as indicated at 22. The foot portion 21 is provided with a sloping curved wall 23 inclined upwardly in the direction of the tubular column 12 and reenforcing bars 24 extend across the foot portion 21 to strengthen and reenforce the same. The foot portion 21 is alined with the relatively wide slot or opening 15 in identically the same manner as the foot portion 17.

Mounted at right angles to the foot portion 17 is a foot member 25 formed of sheet metal bent into U-shape so that its ends may be welded to the tubular column 12 as at 26. The U-shaped foot portion 25 is secured to the column in alinement with the opening 14 and reenforcing bars 27 extend transversely of the sheet metal foot portion to brace and reenforce the same.

Directly in opposed relation to the foot member 25 and alined with the opening 16 is a foot member 28 formed similar to the foot member 21 from sheet metal and bent into U-shape so that it may be welded along the edges, as at 29, to the tubular column 12 in exactly the same manner as the foot portion 17, 21 and 25. The foot portion 28 is formed with a curved wall 30 inclined toward the tubular column 12 to present a rounded corner and present a finished effect. The base thus formed is cruciform in shape and the foot portion 28 may be provided with transversely extending reenforcing bars 31 to strengthen and reenforce the structure. It is to be noted that each of the foot portions 17, 23, 25 and 28 has its ends welded to the column 12 between the respective slots or openings to allow for the passage of a filling material.

The upper portion of the tubular column 12 is provided with diametrically opposed openings 32 and 33 and the opening 32 is adapted to receive a spindle bearing arm 34 located with one edge overlapping one of the edges of the opening 32 so that screws or the like, as at 35, may pass through the opening 36 and be anchored in the spindle bearing arm 34. The opposite edge of the slot 32 is flanged as at 37 and is adapted to engage the opposed edge of the spindle bearing arm 34 so that fastening elements 38, such as screws or the like, may pass through openings 39 in said flange for securely anchoring the spindle bearing arm 34 in place. Threaded in suitably spaced openings 40 in the lower portion of the spindle bearing arm 34 is a pair of inwardly projecting bolts 41 extending toward the center of the tubular column for a purpose which will be hereinafter more fully described.

The slot 33 is adapted to be closed by a metal casting 42 the edges of which abut the flanges 43 formed on opposed edges of the slot 33 so that screws or fastening elements 44 may extend through openings 45 in the flanges 43 and be anchored in suitable threaded openings formed along the edges of the casting 42. Formed integral with the casting 42 is an upwardly extending spindle bearing arm 46 and said spindle bearing arm is offset slightly to aline with the spindle bearing arm 34. The spindle bearing arms 34 and 46 are provided with openings 47 and 48 likewise alined for receiving spindle bearings 49 and 50 for a machine tool spindle as at 51. The machine tool spindle 51 is provided with an arbor portion 52 upon which is mounted a cutting tool or the like, 53, while the opposite end of the spindle 51 is provided with a drive pulley 54 for rotating said spindle and cutting tool 53.

The spindle bearing arms 34 and 46 are connected by a T-bar 55 by means of machine screws 56 extending through the flanges thereof and into suitable openings in the upper portions of said bearing arm and said T-bar 55 is provided with an extension 57 to which is attached a bearing arm 58 as by means of screws or the like at 59 and said bearing arm 58 is provided with an arbor bearing 60 for supporting the free end of the arbor 52.

After the skeleton structure above described is completed concrete 61 is poured in the tubular column 12 and allowed to flow through the openings 13, 14, 15 and 16 into the foot members, as at 62, 63, 64 and 65, thereby increasing the weight of the cruciform foot portion 10 and providing a relatively heavy base having a low center of gravity. The concrete 61 is poured until the column 12 is filled to the extreme upper end thereof, thereby presenting a wall 66 and during the pouring of the concrete 61 the skeleton structure including the column 11 and cruciform foot portion 10 may be positioned on a relatively smooth surface so that the concrete when hardened will provide a bottom wall 67 adapted to lie flush with the floor surface upon which the base is placed.

Formed along opposite edges of the metal casting 42 are guide flanges 68 providing ways for slidably receiving a slide 69 having its edges chamfered as at 70 so that retaining plates 71 may be secured to said edges by bolts or the like, 72, to overlie the ways 68 and slidably retain the slide 69 in position. Formed integral with the slide 69 is a rectilinear guide 73 having ways 74 for slidably receiving a work supporting bed 75. The edges of the work supporting bed 75 extend downwardly along the edges of the ways 74 and key plates 77 overlie the underside of the guide plate 73 and are adapted to be held in place by bolts or the like as at 78 to maintain the work supporting bed 75 in slidable engagement with the ways 74. The slide plate 69 and guide plate 73 are interconnected by means of spaced reenforcing webs 79 and the guide plate 73 is provided with a threaded boss 80 for receiving an adjusting screw 81 the free end of which is threaded in an opening 82 formed in the work supporting bed 75 to facilitate rectilinear movements of the work supporting bed on the slide plate 73.

Secured to the underside of the guide plate 73 as by means of bolts or machine screws 83, is an anchoring block 84 in which is rotatably received an adjusting rod 85 having the lower portion thereof threaded, as at 86, for being threadedly received in a tubular threaded member 87 embedded in the concrete 63 of the foot portion 25. The adjusting rod 85 is provided with a polygonal shaped portion 88 for receiving a wrench to facilitate the vertical adjustment of the slide plate 69 on the ways 68.

A motor supporting bracket 89 is provided at one end with downwardly extending lugs 90 having apertures 91 for receiving the free end of the supporting bar 20 extending through the foot portion 17 of the cruciform base 10 so that the motor supporting bracket 89 may be rocked to facilitate adjustment thereof. A bracket arm 92 is welded to the foot portion 17 and is provided with an adjusting rod 93 having a threaded end 94 extending through an aperture in the motor supporting bracket 89 so that an adjusting nut 95 may be mounted on the threaded portion 94 on opposite sides of the bracket 89 to accommodate vertical adjustment of the bracket. A motor 96 is secured to the bracket 89 by a bolt 97 and the armature shaft of the motor as at 98 is provided with a pulley 99 over which is trained a drive belt 100 for driving the pulley 54 of the spindle 51.

The metal casting 42 is provided with bolts 101 extending inwardly of the column 12 so that said bolts will be anchored in the concrete 61 in a similar manner to the bolts 41. During the flowing of the concrete 61 into the foot portions the bracing rods 19, 24, 27 and 31 will become anchored in the concrete and form a rigid structure of sufficient weight to prevent vibration of the motor 96, spindle 51 and cutter 53.

Various forms of work may be mounted on the work supporting bed 75 and as shown in Figs. 1 and 2, a work supporting member 102 has its base 103 mounted thereon, and said base is provided with bearings 104 for supporting a rotary work spindle 105. The base 103 may be moved to various positions to present the work W to the cutter 53 at various angles and the particular type of work holder shown in Figs. 1 and 2 is provided with a guide 106 for causing the work W to move spirally when the spindle 105 is rotated so that the cutter 53 will form spiral flutes in the workpiece W.

The work support generally indicated by the reference character 102 is generally shown and described in my co-pending application, Serial No. 427,277, filed Jan. 19, 1942, now Patent No. 2,362,288, issued November 7, 1944, relating to Fixtures for machine tools.

It is to be understood that the form of the invention herewith shown and described is to be taken as a preferred embodiment thereof and that various changes in the shape, size and arrangement of parts may be resorted to without departing from the spirit of the invention or the scope of the subjoined claims.

What I claim is:

1. A machine support, comprising a skeletal frame structure having a base portion and a machine supporting portion, said base portion being formed with radially extending foot portions communicating with openings in the machine supporting structure and ballast filler material for the machine supporting structure expanded through said openings into said radially extending foot portions.

2. A machine support, comprising a skeletal frame structure having a base portion and a pedestal portion having openings at the top and bottom thereof, machine spindle supporting plates closing the openings at the top of the pedestal portion and a ballast filler material for the pedestal portion extending through the openings in the bottom portion thereof into the foot portion.

3. A milling machine support, comprising a hollow pedestal portion and a hollow base portion, said pedestal portion being provided with openings on the sides thereof, a pair of diametrically opposed spindle supporting plates mounted in said openings and secured to the upper end of the pedestal portion, guideways formed on one of said plates, a work supporting bed movable on the ways of said plate and a filler material received in said base and pedestal for interconnecting the base and pedestal portions and thereby forming a solid unitary support structure for dampening vibrations of the machine spindle.

4. A milling machine support, comprising a hollow pedestal portion and a cruciform base portion, said base portion being formed of bent metal foot members having their ends welded in opposed relation to openings in the lower portion of the pedestal and a filler material for said hollow pedestal portion extending into the bent metal foot portions of the cruciform base portion.

5. A machine support comprising a hollow tubular pedestal portion having openings diametrically opposed at the top and bottom thereof, bent metal plates secured to the pedestal portion providing foot portions in registry with the lower diametrically positioned openings, machine supporting plates mounted in the upper diametrically located openings for supporting a machine spindle and work table and a filler material received in the pedestal portion adapted to enter the bent metal foot portions and form a structural combination therewith.

6. A milling machine comprising a hollow tubular pedestal portion for supporting a machine tool, bent metal plates secured to the lower end of the pedestal portion in registry with openings therein, providing a cruciform foot portion, means secured to the upper end of the pedestal portion for supporting the spindle of a machine tool, a motor adjustably mounted on one of the foot portions for driving the spindle, an adjustable work supporting plate carried by the upper end of the pedestal portion and a filling material received in the pedestal portion of relatively heavy material adapted to pass through said openings in the lower portion thereof to form a unitary structure therewith.

WILLIAM MELIN.